No. 849,837. PATENTED APR. 9, 1907.
L. W. EGGLESTON.
VALVE STEM PACKING.
APPLICATION FILED JAN. 18, 1907.
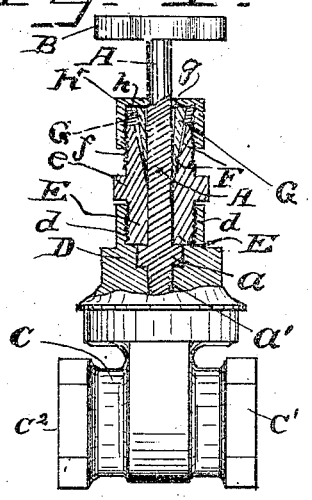
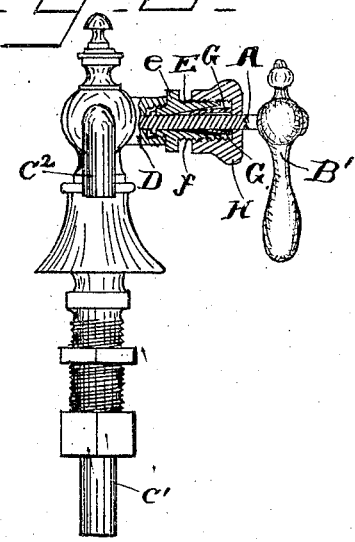
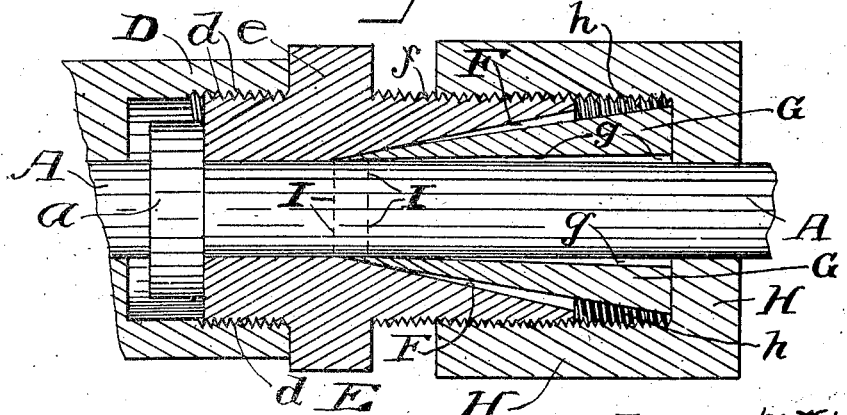
Witnesses:
C. A. Adams
A. N. Tagert
Inventor:
Lewis Watson Eggleston,
By Charles Turner Brown,
Atty.

UNITED STATES PATENT OFFICE.

LEWIS WATSON EGGLESTON, OF APPLETON, WISCONSIN.

VALVE-STEM PACKING.

No. 849,837.  Specification of Letters Patent.  Patented April 9, 1907.

Application filed January 18, 1907. Serial No. 352,867.

*To all whom it may concern:*

Be it known that I, LEWIS WATSON EGGLESTON, a citizen of the United States, and a resident of Appleton, in the county of Outagamie, in the State of Wisconsin, have invented certain new and useful Improvements in Valve-Stem Packing, of which the following, when taken in connection with the drawings accompanying and forming a part hereof, is a full and complete description, sufficient to enable those skilled in the art to which it pertains to understand, make, and use the same.

This invention relates to the packing and holder therefor for stems in steam, hot-water valves, bib-cocks, and bib-valves wherein the stem has a rotary movement and does not have a longitudinal movement when operated; and the object of the invention is to obtain a metallic packing to a valve or bibcock stem by which and without the use of other or additional packing a steam and water tight joint is easily obtained and maintained, and at the same time the valve-stem is not held so tightly as to make the operation thereof difficult to a child or woman.

In the drawings, Figure 1 is an elevation of a gate-valve, showing enough of the stem and holder thereof in section to expose to view a construction embodying this invention. Fig. 2 is a front elevation of a bib-cock, showing enough of the stem and holder thereof in section to expose to view a construction embodying this invention; and Fig. 3 is a sectional view, on an enlarged scale, of a portion of a rotatable valve or cock stem and packing embodying this invention.

A reference-letter applied to designate a given part is used to indicate such part throughout the several figures of the drawings wherever the same appears.

A is a valve or cock stem.

$a$ is a disk rigidly secured to the stem A. Disk $a$ is the ordinary disk provided to prevent longitudinal movement of the stem.

$a'$ is a screw-thread at the lower end of the stem A in the construction illustrated in Fig. 1 such screw-thread arranged to engage with the gate in casing C.

B, Fig. 1, is a disk; and B', Fig. 2, is a handle. Such disk and handle are respectively rigidly secured to stem A to turn therewith.

C is the casing of the gate-valve illustrated in Fig. 1.

C' is the inlet of the valve illustrated in Fig. 1 and of the bib-cock illustrated in Fig. 2, and $C^2$ $C^2$ are respectively the outlets thereof.

D is the portion of the holder of stem A which is rigidly attached to or forms a part of the shell or casing of a valve or cock.

E is a removable part of the holder of stem A and is provided with part $e$, on which a wrench may be fitted to turn it, and with screw-threads engaging with corresponding screw-threads $d$ in part D of the holder. One end of the removable part E is in contact with disk $a$ of stem A to prevent longitudinal movement of such stem. Part E is provided with a hole therethrough for stem A and with the conical recess F at one end of such hole to receive the end of the packing G.

H is the adjustable cap of the stem-holder and is provided with female threads $h$ engaging with threads $f$ on part E of the holder.

$g$ is a tapering hole—that is, a hole gradually diminishing in size in the diameter thereof—through which stem A is placed in assembling the several parts of the apparatus. The smaller end of such hole corresponds closely in diameter with the diameter of stem A, so that when the packing $G$, through which such hole $g$ extends, is placed on the stem A and such packing is forced downward into the recess F by the turning downward thereonto of the cap H that portion of the end of the packing G which is of substantially the same diameter as the stem (say that portion of packing G between lines I I, Fig. 3) is made to fit so tightly to such stem and to the peripheral wall of recess F as to prevent the passage of steam or water thereby.

By reference to the drawings, particularly Fig. 3, it will be observed that the peripheral wall of the recess F and the peripheral surface of the packing G are not of the same "taper" and are not in contact throughout their entire length. Because of the taper of the hole $g$ and the variation in the taper of the packing G on the face thereof adjacent to the tapering wall of recess F, the packing G is not in contact with either stem A or removable part E for any considerable portion of the length of such packing, and it occurs that such packing G can be forced into position between the stem A and removable part E by the turning of the cap H, so that steam and water will not pass by the packing in the use of the valve or cock, while at the same time the stem A may be readily turned. This packing and stem is particularly useful in hot-water heating and in and about the water cocks and faucets of sinks and washstands. Packing G is preferably made of soft copper or a composition metal of substantially the same ductility.

I have described the hole $g$ in packing G as tapering or of diminishing diameter; but it will be evident to those skilled in the art that if such packing G be made of ductile metal which is softer than the metal of removable part E and the hole $g$ is made cylindrical, but of larger diameter than stem A, the packing G in the construction shown and described may be forced into recess F by turning cap H with a wrench until the end of such packing which is adjacent to the smaller end of the recess F is forced against the stem A to make the desired joint, and at such time the hole $g$ will be of substantially diminishing diameter, as described.

Having thus described the construction of a packing, a stem, and a holder therefor embodying my invention, what I claim is new, and desire to secure by Letters Patent, is—

1. The combination of a metallic packing and holder therefor, comprising a holder provided with a hole therethrough for a stem and with a tapering recess for the packing at one end of the valve-stem hole, a metallic packing provided with a tapering peripheral face of less taper than the adjacent face of the recess therefor, and such packing provided with a hole therethrough of diminishing diameter, and means to force the packing into the recess; substantially as described.

2. The combination of a stem, a holder provided with a hole therethrough for the stem, and provided with a tapering recess at one end of the valve-stem hole, a metallic packing provided with a tapering peripheral face of less taper than the adjacent face of the recess therefor, such packing provided with a hole therethrough of larger diameter than the valve-stem, the metallic wall of the tapering recess and the circumferential wall of the stem of harder metal than the metal of the packing and means to force the packing into the recess; substantially as described.

LEWIS WATSON EGGLESTON.

In presence of—
  CHARLES TURNER BROWN,
  CORA A. ADAMS.